United States Patent [19]
Kimura et al.

[11] Patent Number: 6,128,258
[45] Date of Patent: Oct. 3, 2000

[54] TILT DETECTION METHOD AND OPTICAL DISK DRIVE

[75] Inventors: Katsuhiko Kimura; Yoshiaki Yamauchi; Seiichi Kato; Naruo Watanabe, all of Ibaraki-ken, Japan

[73] Assignee: Hitachi, Ltd., Tokyo, Japan

[21] Appl. No.: 09/123,404

[22] Filed: Jul. 28, 1998

[30] Foreign Application Priority Data

Jul. 31, 1997 [JP] Japan .................................. 9-205794

[51] Int. Cl.⁷ ...................................................... G11B 7/09
[52] U.S. Cl. .................................. 369/44.32; 369/44.28; 369/54; 369/116
[58] Field of Search ............................... 369/44.27, 44.28, 369/44.29, 44.32, 44.34, 44.37, 44.41, 47, 48, 49, 50, 54, 58, 116

[56] References Cited

U.S. PATENT DOCUMENTS

| | | | |
|---|---|---|---|
| 5,859,818 | 1/1999 | Tateishi et al. | 369/44.32 |
| 5,886,496 | 3/1999 | Furukawa et al. | 369/44.32 X |
| 5,914,923 | 6/1999 | Araki et al. | 369/44.32 |

FOREIGN PATENT DOCUMENTS 0 765 015 A1   3/1997   European Pat. Off. .

*Primary Examiner*—Muhammad Edun
*Attorney, Agent, or Firm*—Antonelli, Terry, Stout & Kraus, LLP

[57] ABSTRACT

In an optical disk drive using as a light source a semiconductor laser having a main electrode and a plurality of subsidiary electrodes, a wave front of a generated laser beam is modulated by controlling injection currents to the plurality of subsidiary electrodes, in accordance with a change in signal outputs when the wave front is modulated, a tilt is detected between a direction normal to the surface of an optical disk and an objective lens optical axis, and in accordance with the detected tilt, the injection currents to the semiconductor laser are determined to correct the tilt. Since the tilt is detected and corrected through electrical modulation, the system can be made compact without using new components for tilt detection, and high speed control up to a high frequency becomes possible because there is no limit of the control bandwidth to be caused by sub-resonances in a high frequency band, like a mechanical actuator.

5 Claims, 6 Drawing Sheets

| | CONTROL CURRENT | |
|---|---|---|
| | Is1 (mA) | Is2 (mA) |
| ⬡ | 100 | 60 |
| △ | 90 | 70 |
| ○ | 80 | 80 |
| □ | 70 | 90 |
| ⬡ | 60 | 100 |

FIG.6A  CONTROL CURRENT
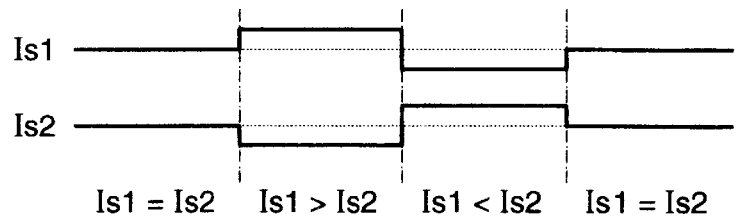
FIG.6B  COMA
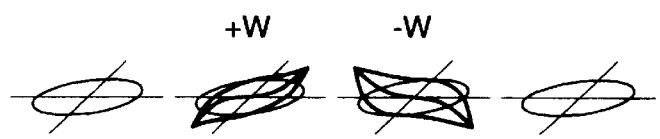
FIG.6C  WITHOUT TILT
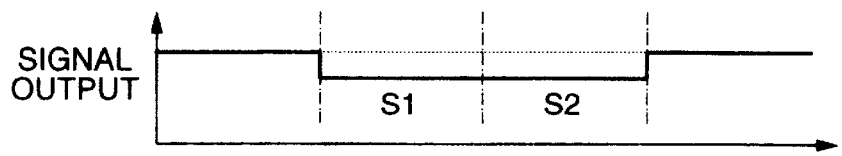
FIG.6D  WITH TILT OF $+\theta$
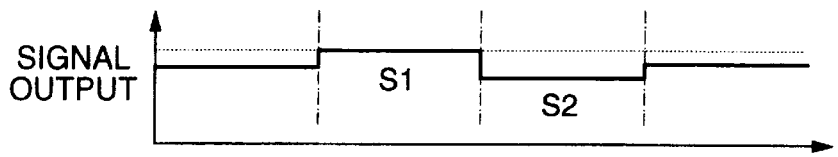

TILT DETECTION METHOD AND OPTICAL DISK DRIVE

BACKGROUND OF THE INVENTION

1. Field of the Invention

The present invention relates to an optical disk drive, and more particularly to a method of detecting a tilt of an optical converging system relative to an optical disk, the converging system applying a laser beam to the optical disk, and to an optical disk drive for correcting the detected tilt.

2. Description of the Related Art

High density recording has long been desired for optical disk drives used with compact disks and computer storages. High density recording methods proposed and adopted heretofore incorporate increasing a numerical aperture of an objective lens which applies a laser beam to an optical disk, using a semiconductor laser capable of emitting a laser beam having a shorter wavelength and hence a finer light spot, increasing a density in the radial direction through land group recording, utilizing multi-layer recording, ultra high resolution techniques, signal processing techniques, and the like.

Of these methods, the increase of a numerical aperture of an objective lens and the short wavelength of a semiconductor laser are direct approaches to high density recording. However, as the numerical aperture of an objective lens increases, the influence of coma increases greatly and the signal read/write characteristics are degraded. The coma is caused by a tilt between the recording surface of an optical disk and the optical axis of an objective lens, more specifically, by a tilt angle θ between the optical axis of an objective lens and a normal to the recording surface of an optical disk at the cross point between the optical axis of the objective lens and the recording surface of the optical axis.

The coma Wc to be caused by a tilt between an optical disk and the optical axis of an objective lens is given by the following equation (1) by using the polar coordinates (r, α) of the cross section perpendicular to the optical axis of a laser beam.

$$Wc=[t(n^2-1)n^2 \sin \theta \cos \theta]/[(2(n^2-\sin^2\theta)^{5/2}] \times (NA)^3 (r/R)^3 \cos \alpha \quad (1)$$

where t represents a thickness of a disk substrate, n is a refractive index of the disk substrate, θ represents a tilt angle between the optical disk and an optical axis (an angle between a normal to the recording surface of the optical disk and the optical axis of an objective lens), NA represents a numerical aperture of the objective lens, and R is an effective radius of the objective lens. The coma therefore increases in proportion with the objective lens numerical aperture raised to the third power and the disk substrate thickness and tilt angle. As the coma increases, the diameter of a spot focussed on an optical disk increases and an error of read/write may occur. It is therefore necessary to detect and correct the disk tilt in order to increase the objective lens numerical aperture NA for high density recording. As a conventional disk tilt detecting and correcting method, techniques disclosed in the publication of JP-A-3-137831 are being made public. According to these techniques, a tilt error detector mounted near at an objective lens detects a tilt of an optical disk, and in accordance with this detected tilt, an objective lens holder supported by a suspension spring is moved and tilted to correct the disk tilt.

With this disk tilt detecting method, however, an optical light source and a photodetector are required in addition to a conventional optical system in order to detect the disk tilt. Furthermore, with this disk tilt correcting method, a mechanism for changing the position of an objective lens is also required. The conventional disk tilt detecting and correcting method is therefore unsatisfactory in that the system becomes complicated and expensive.

In another conventional method disclosed in JP-A-9-83082, corresponding to U.S. patent application Ser. No. 08/697002 filed Aug. 16, 1996 which is hereby expressly incorporated in its entirety herein by reference, a semiconductor laser device is provided with a main electrode and a plurality of subsidiary electrodes, and current injected to the subsidiary electrodes is controlled to correct a tilt between an optical disk and the optical axis of a laser beam. With this method, however, a tilt detecting method and its circuit configuration are not explicitly disclosed.

SUMMARY OF THE INVENTION

Under the circumstances of the above-described problems, the present invention aims at providing an optical disk drive capable of easily detecting and correcting a disk tilt without changing the structure of a conventional optical disk drive.

In order to achieve the above object, according to a first means of the present invention, in a method of detecting a tilt between a direction normal to a surface of an optical disk and the optical axis of a laser beam in accordance with light reflected from the optical disk when the laser beam radiated from a semiconductor laser as a light source is converged by a converging optical system onto the optical disk, the semiconductor laser has a main electrode and a plurality of subsidiary electrodes for current injection, a wave front or intensity distribution of the laser beam to be radiated from the semiconductor laser is modulated by controlling injection currents to the main and subsidiary electrodes, and a tilt amount between the optical disk and the converging optical system, as an angle between a normal to the optical disk recording surface and the optical axis at a cross point between the optical axis of the laser beam and the optical disk recording surface, is detected in accordance with reproduced signal outputs before and after the modulation.

According to a second means of the present invention, in a method of detecting a tilt between a direction normal to a surface of an optical disk and the optical axis of a laser beam in accordance with light reflected from the optical disk when the laser beam radiated from a semiconductor laser as a light source is converged by a converging optical system onto the optical disk, the semiconductor laser has a main electrode and a plurality of subsidiary electrodes for current injection, a wave front or intensity distribution of the laser beam to be radiated from the semiconductor laser is modulated by controlling injection currents to the main and subsidiary electrodes, synchronously with converging the laser beam onto an area of the optical disk where a signal of a predetermined frequency is recorded or onto an area of the optical disk where no signal is recorded, and a tilt amount between the optical disk and the converging optical system, as an angle between a normal to the optical disk recording surface and the optical axis at a cross point between the optical axis of the laser beam and the optical disk recording surface, is detected in accordance with reproduced signal outputs before and after the modulation.

According to a third means of the present invention, in an optical disk drive for information recording/reproducing having a semiconductor laser with a main electrode and a plurality of subsidiary electrodes for current injection, a converging optical system for converging a laser beam radiated from the semiconductor laser onto an optical disk, a reproduced signal detection circuit for detecting a reproduced signal from the laser beam reflected by the optical disk, and a laser control circuit for controlling injection currents to the main electrode and the plurality of subsidiary electrodes, the optical disk drive has a tilt detection/correction circuit for controlling the laser control circuit to change injection currents to the plurality of subsidiary electrodes, detecting a tilt amount between the optical disk and the converging optical system, as an angle between a normal to the optical disk recording surface and the optical axis at a cross point between the optical axis of the laser beam and the optical disk recording surface, in accordance with reproduced signal outputs before and after injection current changes, and eliminating the influence of the tilt between the optical disk and the converging optical system upon the reproduced signal outputs by making the laser control circuit to control the injection currents to the plurality of subsidiary electrodes of the semiconductor laser in accordance with the detected tilt amount.

According to a fourth means of the invention, in the third means, the tilt detection/correction circuit modulates the wave front or intensity distribution of the laser beam to be radiated from the semiconductor laser by controlling injection currents to the main electrode and the plurality of subsidiary electrodes, synchronously with converging the laser beam onto an area of the optical disk where a signal of a predetermined frequency is recorded, onto a pit of the optical disk dedicated for tilt detection, onto a pit of the optical disk formed in a sector field, or onto an area of the optical disk where no signal is recorded.

According to a fifth means of the invention, in the third means, the tilt detection/correction circuit detects the amplitudes of reproduced signals before and after the injection current changes, and controls the injection currents to the main electrode and the plurality of subsidiary electrodes of the semiconductor laser so as to maximize the reproduced signal amplitudes.

BRIEF DESCRIPTION OF THE DRAWINGS

FIG. 6A shows a change in injected control current.

FIG. 6B shows a change in coma.

FIG. 6C shows a change in an output signal without a tilt between an optical disk and an optical axis of an objective lens.

FIG. 6D shows a change in an output signal with a tilt between an optical disk and an optical axis of an objective lens.

DETAILED DESCRIPTION OF THE PREFERRED EMBODIMENTS

Embodiments of an optical disk drive according to the invention will be described with reference to the accompanying drawings. The optical disk drive is constituted of an optical disk 9 in which information is recorded, drive means having a spindle motor for rotating the optical disk 9, an optical head unit for reading and writing information from and to the optical disk 9 under rotation, and the like.

Figure 1:
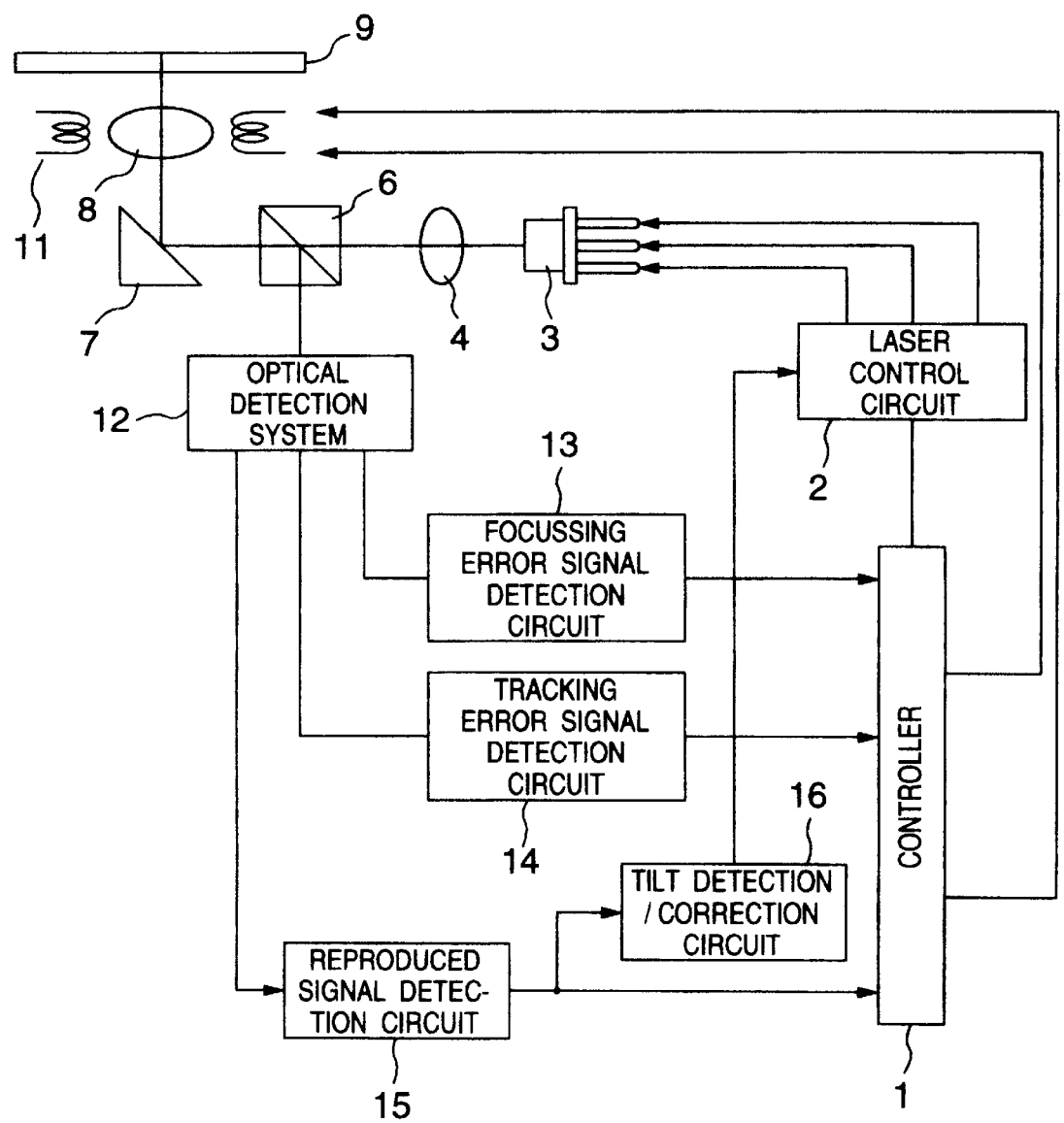
FIG. 1 is a schematic block diagram showing the structure of an optical head of an optical disk drive according to an embodiment of the invention.

FIG. 1 shows the structure of the optical head unit of an optical disk drive according to an embodiment of the invention. The optical head unit shown in FIG. 1 is constituted of the following components: a semiconductor laser 3 as a light source; a collimating lens 4 disposed on an optical axis of a laser beam radiated from the semiconductor laser 3; a beam splitter 6 disposed on an optical axis of light passed through the collimating lens 4; an upright mirror 7 for reflecting light passed through the beam splitter 6 and changing the direction of light by a right angle; an objective lens 8 disposed on an optical axis of light reflected from the upright mirror 7 for converging light onto the recording surface of an optical disk 9; an objective lens actuator 11 mounted near at the objective lens 8; an optical detection system 12 disposed on an optical axis of light reflected from the beam splitter 6; a focussing error signal detection circuit 13; a tracking error signal detection circuit 14; a reproduced signal detection circuit 15, the circuits 13, 14 and 15 being connected to the output side of the optical detection system 12: a controller 16 connected to the output sides of the circuits 13, 14 and 15; a tilt detection/correction circuit 16 connected to the output side of the reproduced signal detection circuit 15: and a laser control circuit 2 connected to the output sides of the tilt detection/correction circuit 16 and controller 1. The output side of the controller 1 is also connected to the objective lens actuator 11.

In reading information recorded in the optical disk 9, the semiconductor laser 3 of the optical head unit shown in FIG. 1 is driven in response to signals from the controller 1 and laser control circuit 2, to radiate a laser beam. The laser beam radiated from the semiconductor laser 3 is made parallel by the collimating lens 4, transmits through the beam splitter 6, is reflected by the upright mirror 7, and converged by the objective lens 8 onto the recording surface of the optical disk 9.

The light converged onto the recording surface is reflected and passes through the objective lens 8 and upright lens 7, and is reflected by the beam splitter 6 in the direction generally perpendicular to the incoming optical path. The light reflected by the beam splitter 6 is supplied to the optical detection system 12. In accordance with this supplied light, the focussing error signal detection circuit 13 detects a focussing error signal, the tracking error signal detection circuit 14 detects a tracking error signal, and the reproduced signal detection circuit 15 detects a reproduced signal.

In the embodiment shown in FIG. 1, an infinite optical system using the collimating lens 4 is shown. The invention is not limited only to the infinite optical system. For example, the cross section of a laser beam may be shaped with a beam shaping prism, or a finite optical system used by a compact disk may also be used.

The focussing and tracking error signals are detected by using known technologies such as an astigmatism method and a push-pull method. The reproduced signal may be detected from an intensity change to be caused by a presence/absence of pits on an optical disk such as a compact disk, from an intensity change to be caused by a difference between crystal structures of a phase change disk, or from a rotation amount of a polarizing plane of a photomagnetic disk. The invention is applicable to either of these detection methods, and is not limited to a particular signal detection method.

The detected focussing error signal is added, if necessary, with an offset amount supplied from the controller 1, and used as a control signal for driving the objective lens actuator 11 along the optical axis direction. In response to this signal, the optical lens actuator 11 is driven along the optical axis direction to perform a focussing servo control which makes a light spot be focussed on the recording surface of the optical disk.

Similarly, the detected tracking error signal is added, if necessary, with an offset amount supplied from the controller 1, and used as a control signal for driving the objective lens actuator 11 along the radial direction of the optical disk 9. In response to this signal, the optical lens actuator 11 is driven along the radial direction of the optical disk 9 to make the light spot trace a track of the optical disk 9.

A method of changing a wave front aberration of light converged onto the optical disk 9 will be described. In this embodiment, in order to realize this method, a semiconductor later is used which can change the wave front of generated light.

Figure 2:
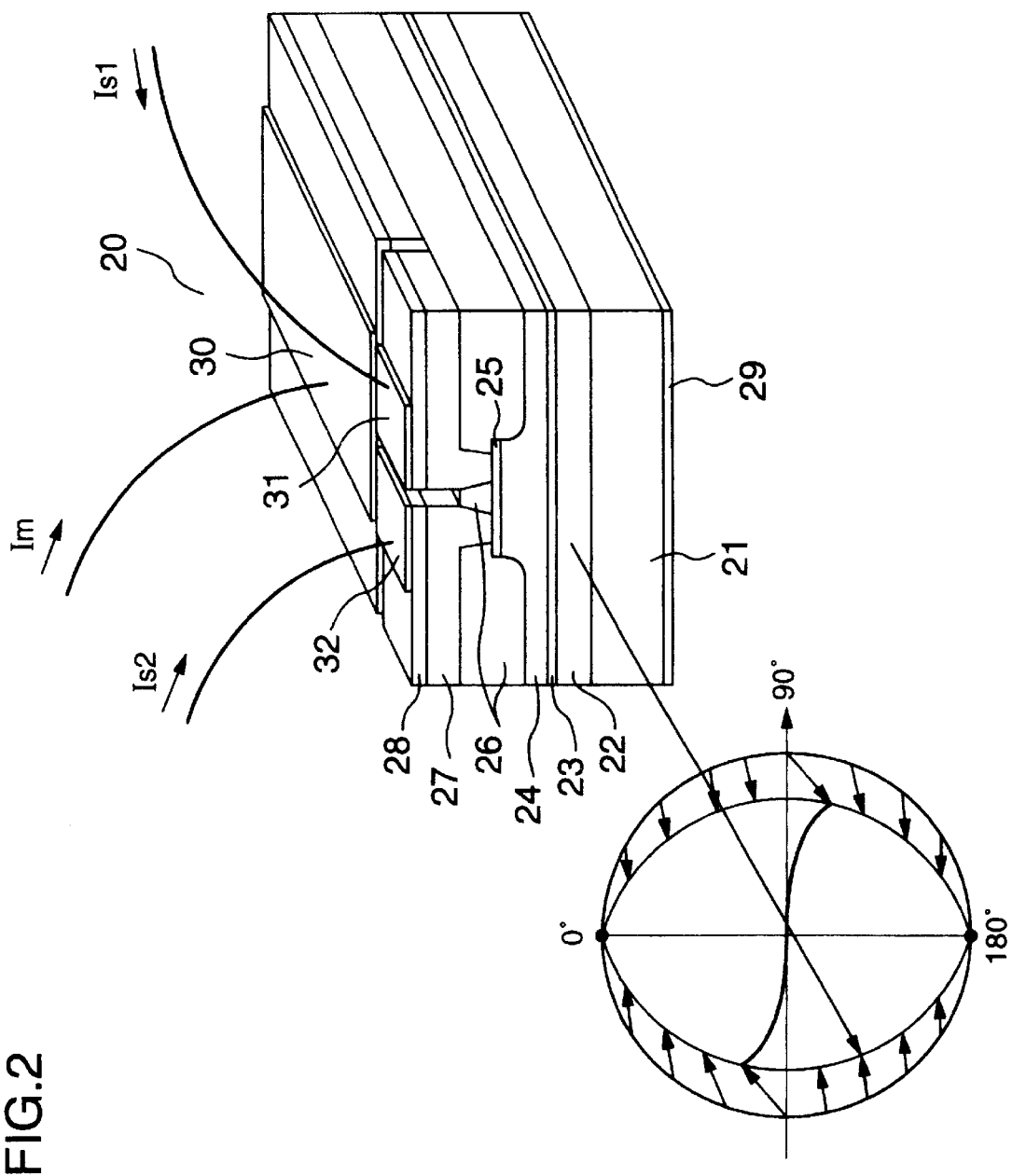
FIG. 2 is a perspective view of a semiconductor laser device showing in FIG. 1 which emits a laser beam.

With reference to FIG. 2, the structure of a semiconductor laser of this embodiment will be described. First, on an n-GaAs substrate 21, crystals are sequentially grown to form an n-AlGaAs clad layer 22, an AlGaAs multiple quantum well active layer 23, a p-AlGaAs clad layer 24, and a p-GaAs contact layer 25. Next, an $SiO_2$ film of a stripe shape is formed by using chemical vapor deposition and photolithography techniques. By using this $SiO_2$ film as a mask, the p-GaAs contact layer 25 and p-AlGaAs clad layer 24 are partially etched. Next, by using an $SiO_2$ film as a mask, an n-AlGaAs block layer 26 is selectively grown. After the $SiO_2$ film is removed, a p-AlGaAs buried layer 27 and a p-GaAs cap layer 28 are sequentially deposited. Next, a surface electrode and a bottom electrode 29 are formed.

Separation grooves are formed in the surface electrode, p-GaAs cap layer 28, and p-AlGaAs buried layer 27. The separation grooves include a first groove formed along a direction perpendicular to a longitudinal direction of the p-GaAs contact layer 25 for separating a main electrode and a subsidiary electrode, and a second groove formed along a direction perpendicular to the first groove for dividing the subsidiary electrode into two subsidiary electrodes. With these separation grooves, the surface electrode is divided into a main electrode 30 and two subsidiary electrodes 30 and 31. A wafer having the above structure is cleaved into chips having a predetermined size to form a semiconductor laser 20. This semiconductor laser 20 is sealed in a package to form the semiconductor laser 3 as a light source. A laser beam is radiated from the front facet of the semiconductor laser 20 as viewed in FIG. 2 along a direction parallel to the second groove.

The shape of a wave front of a laser beam radiated from the semiconductor laser 20 can be changed by changing control currents Is1 and Is2 injected to the two subsidiary electrodes 31 and 32 while a predetermined current Im is injected to the main electrode 30 to allow laser oscillation. In this embodiment, although two subsidiary electrodes are used, it is preferable to use subsidiary electrodes more than two in order to more finely control the wave front shape.

Figures 3A, 3B:
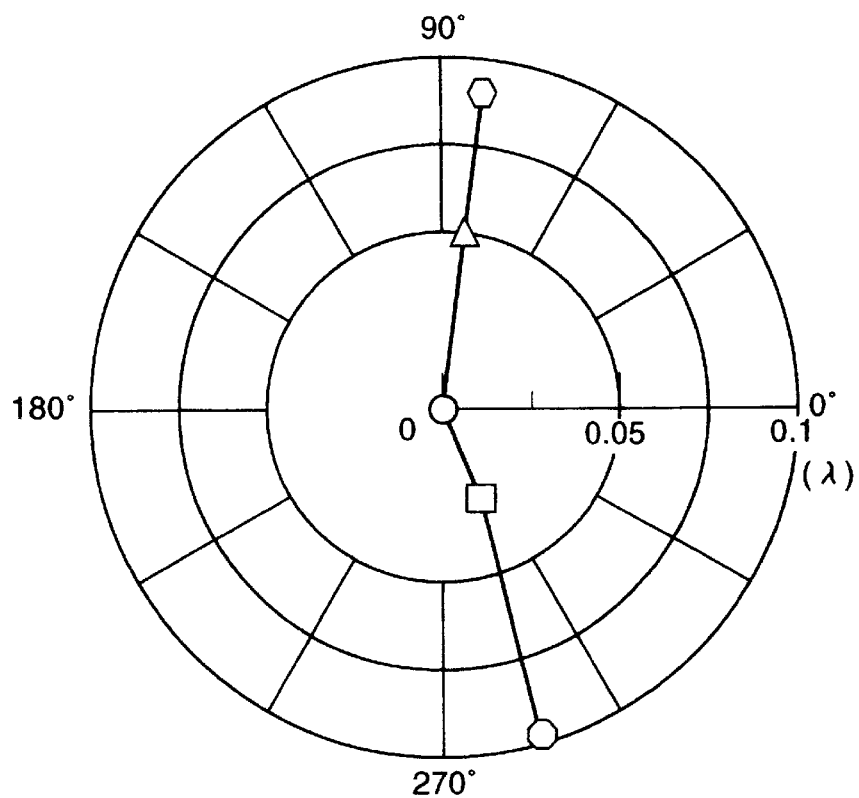
FIG. 3A is a diagram showing an example of coma measurement results.
FIG. 3B is a diagram explaining the relation between each symbol shown in FIG. 3A and corresponding control currents.
Figure 4:
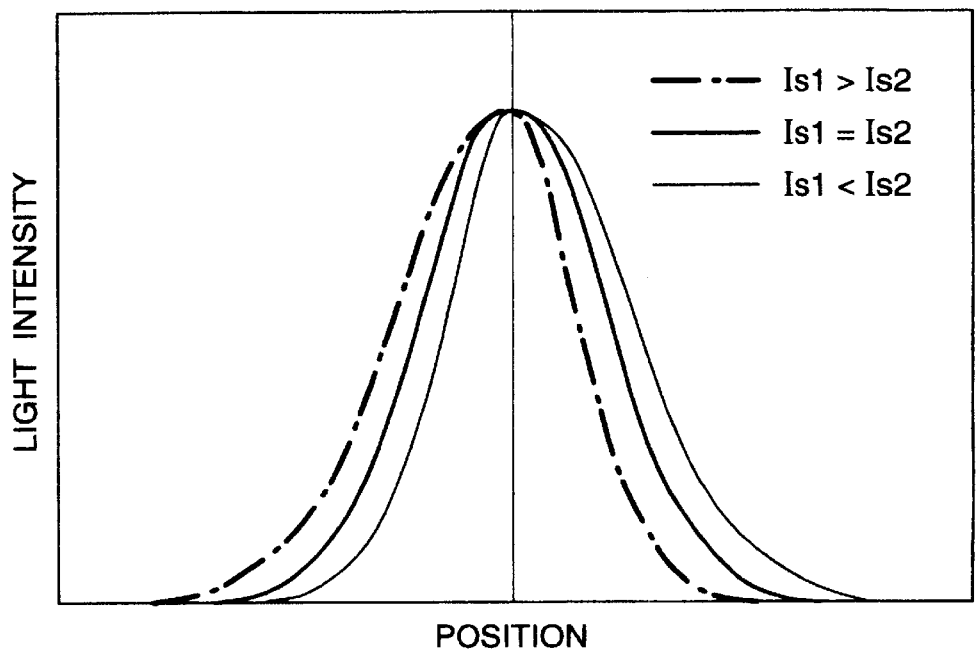
FIG. 4 is a graph showing a change in a light intensity distribution relative to current injected to subsidiary electrodes.

FIGS. 3A and 3B show measurement results of the changes in coma with the control currents Is1 and Is2 injected to the subsidiary electrodes 31 and 32. FIG. 3A show the directions and values of maximum comas represented by symbols, in a cross section perpendicular to the optical axis of a laser beam, each symbol corresponding to a combination of control currents shown in FIG. 3B. A direction of 0° shown in FIG. 3A corresponds to the upward direction in FIG. 2, and a direction of 90° corresponds to a left direction when the direction of 0° is set upward as viewed from the upstream to downstream of a laser beam. As seen from FIGS. 3A and 3B, the direction of a maximum coma changes by about 180° and the value thereof also changes, as the combination of the control currents Is1 and Is2 is changed. By controlling the injection current, it is possible to realize a semiconductor laser capable of changing the wave front of generated light. The light intensity distribution can also be changed asymmetrically relative to the optical axis as shown in FIG. 4.

As described earlier, the coma is generated when the normal to the optical disc recording surface does not become parallel to the optical axis of the objective lens. It is therefore possible to detect and correct a tilt by changing a generated light coma by controlling the injection currents to the semiconductor laser 20. The coma changes if the wave front of a laser beam is modulated. A tilt detection method of this invention will be described hereinunder.

Figure 5:
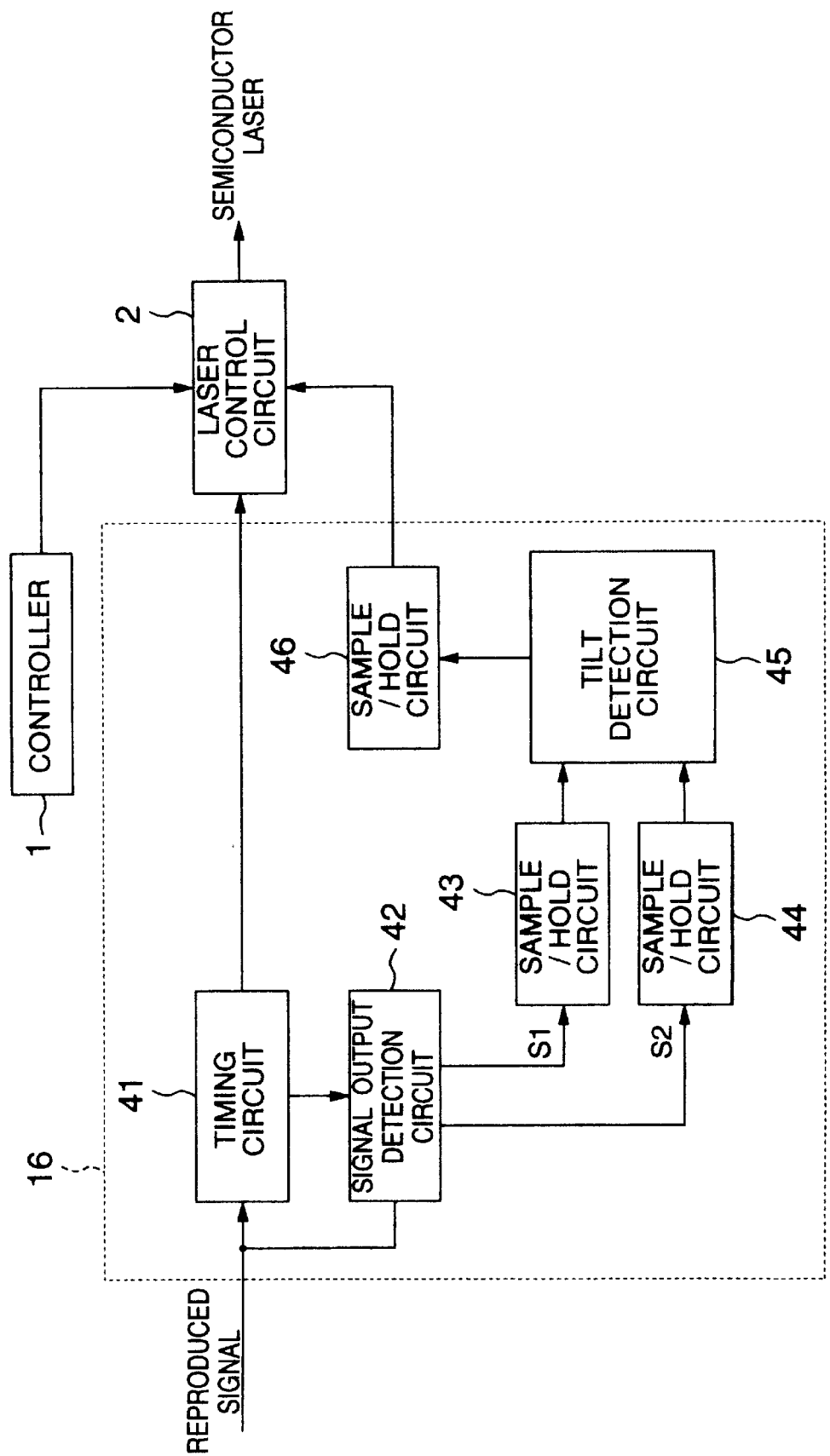
FIG. 5 is a block diagram showing the structure of a tilt detection/correction circuit of the embodiment shown in FIG. 1.

FIG. 5 shows the structure of the tilt detection/correction circuit 16 shown in FIG. 1, and FIGS. 6A to 6D illustrate the operation of tilt detection. The tilt detection/correction circuit 16 is constituted of: a timing circuit 41 to which a reproduced signal is input; a signal output detection circuit 42 to which the reproduced signal and an output from the timing circuit 41 are input; sample/hold circuits 43 and 44 connected to the output side of the signal output detection circuit 42; a tilt detection circuit 45 connected to the output side of the sample/hold circuits 43 and 44; and a sample/hold circuit 46 connected to the output side of the tilt detection circuit 45. An output of the timing circuit 41 and an output of the sample/hold circuit 46 are supplied to the laser control circuit 2.

The timing control circuit 41 generates a signal for modulating the control currents Is1 and Is2 injected to the subsidiary electrodes 31 and 32 of the semiconductor laser 20 (modulating one of the control currents in an increasing direction and the other in a reducing direction at the same time). Changes of the injected control currents Is1 and Is2 are shown in FIG. 6A, and changes of the coma are shown in FIG. 6B. In FIGS. 6A and 6B, the coma for Is1>Is2 is represented by +W, and the coma for Is1<Is2 is represented by −W. It is assumed that the comas +W and −W correspond to positive and negative directions of tilts between an optical disk and the optical axis of an objective lens. A tilt can be detected from a change in light reflected from the optical disk, i.e., a change in the reproduced signal output, while the coma is changed between +W and −W.

While the coma is modulated between +W and −W, signal outputs S1 and S2 are detected by the signal output detection circuit 42 and stored in the sample/hold circuits 43 and 44. A difference between the stored S1 and S2 is calculated by the tilt detection circuit 45 by using the equation (1), so that a tilt signal representative of a tilt amount between the optical disk and the optical axis of the objective lens can be obtained. The tilt amount may be obtained by comparing the outputs from the sample/hold circuits 43 and 44 with the contents of a table such as shown in FIG. 3B in which a relation between injected currents and tilt angles is stored, by measuring in advance a relation between control currents and output signal changes.

FIG. 6C shows an output signal without a tilt between an optical disk and the optical axis of an objective lens. In this case, the signal output becomes maximum in a standard state while the coma is not modulated. The signal outputs S1 and S2 become equal and lower than those in the standard state while the comas are modulated to +W and −W. Accordingly, if a difference between the signal outputs S1 and S2 calculated by the tilt detection circuit 45 is zero, there is no tilt between the optical disk and the optical axis of the objective lens.

FIG. 6D shows an output signal with a positive direction tilt between an optical disk and the optical axis of an objective lens. In this case, because of a tilt between the optical disk and the optical axis of the objective lens, the area of a light spot converged onto the optical disk is made broad even in the standard state (Is1=Is2). Therefore, the signal output lowers as compared to the standard state shown in FIG. 6C. As the coma is modulated to +W, this modulation direction is a direction of cancelling the coma caused by the positive tilt, so that the light spot converged onto the optical disk can be improved and the signal output S1 becomes larger than that in the standard state. As the coma is modulated to −W, this modulation direction is a direction of increasing the coma larger than that in the standard state, so that the signal output S2 lowers more than that in the standard state. Accordingly, there is a difference between S1 and S2 and a signal corresponding to the tilt can be detected.

Conversely, if there is a negative direction tilt, the signal output S2 when the coma is modulated in the −W direction becomes larger than the signal output S1 when the coma is modulated in the +W direction, as opposed to the case shown in FIG. 6D. Therefore, a negative direction tilt signal can be detected through the calculation of a difference between S1 and S2.

Next, a tilt correction method will be described. The tilt signal detected by the above method is stored in the sample/hold circuit 46. In accordance with this signal, the laser control circuit 2 controls the currents injected to the main and subsidiary electrodes, 30, 31 and 32 of the semiconductor laser 20 to set a wave front corresponding to the detected tilt. Specifically, as shown in FIG. 6D, if the +θ tilt is detected, correction injection currents (Is1'>Is2') corresponding to the tilt θ are injected so that light without coma can be applied to the optical disk. As the wave front of the radiated laser beam is corrected to the wave front corresponding to the detected tilt, i.e., as the injection currents to the subsidiary electrodes 31 and 31 are modulated so as to make the signal outputs S1 and S2 equal, the coma to be caused by a tilt between the optical disk and the optical axis of the objective lens can be corrected. With this coma correction, the diameter of a light spot converged onto the optical disk recording surface can be prevented from being broadened, without mechanically correcting a tilt between the optical disk and the optical axis of the objective lens.

Figure 7:
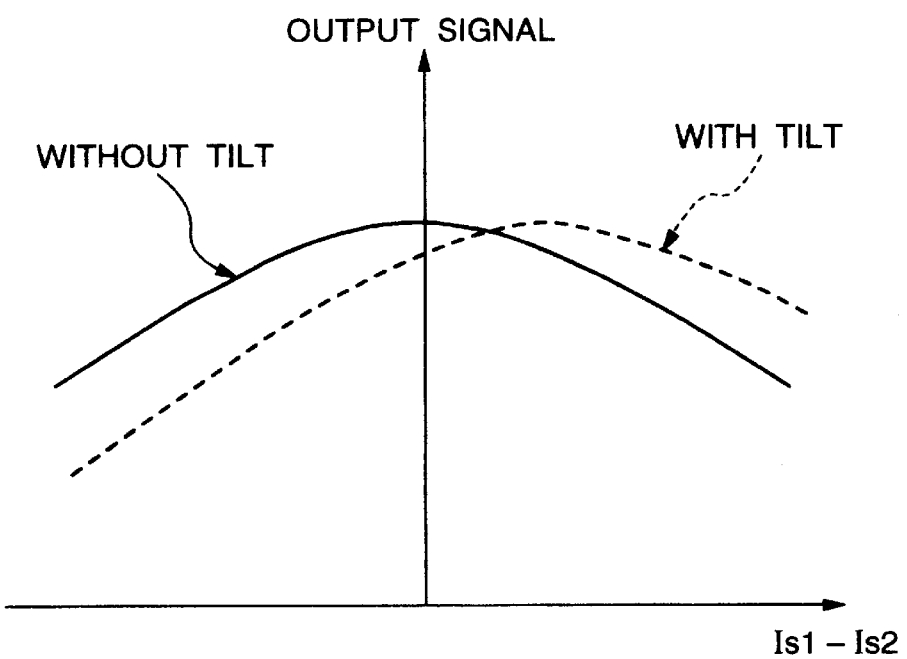
FIG. 7 is a graph illustrating a tilt detection operation according to another embodiment of the invention.

In the above embodiment, the coma is changed between three stages: the standard stage, +W and −W stages. The number of stages for changing the coma may be increased to detect a tilt more precisely, or the coma may be changed continuously in a predetermined range. An example of the signal outputs when the coma is changed continuously, is shown in FIG. 7. In this example, the influence of a tilt can be cancelled most when the signal output becomes maximum. It is therefore possible to correct a tilt by controlling a control current in such a manner that the signal output becomes maximum.

The tilt detection method may be performed by using a specific area of an optical disk as will be described in the following. The best way to detecting a tilt by using a specific area of an optical disk, is to provide an area of an optical disk where a signal of a predetermined frequency is recorded. In this case, a laser beam is applied to the area where a signal of the predetermined frequency is recorded, and under this state, the coma is modulated by injection current to the semiconductor laser. The amplitude of the reproduced signal of the recorded signal having the predetermined frequency is detected, and the tilt between the optical disk and the optical axis of the objective lens is detected from a change in the amplitude of the reproduced signal with the modulated coma. In accordance with the detected tilt, the injection current to the semiconductor laser is determined to correct the tilt, similar to the above-described embodiment.

The second best way is to perform the above-described tilt detection method by using an area of an optical disk where no signal is recorded. Alto in this case, the tilt detection/correction method is the same as the above embodiment.

Another way to performing the tilt detection method by using a specific area of an optical disk is to provide an optical disk with the pit which is used for detecting a tilt. This pit may be a pit provided for tilt detection only or a pit already formed in a sector field. In detecting a tilt, the coma is modulated by the injection current to the semiconductor laser, and a signal output of light reflected from the optical disk is detected. A tilt is detected in accordance with a change in the signal output corresponding to the modulated coma. In accordance with the detected tilt, the injection current to the semiconductor laser is determined to correct the tilt, similar to the above-described embodiment.

In the above description, the tilt detection/correction method is performed paying attention to the coma of light radiated from the semiconductor laser. However, as shown in FIG. 4, as the injection current to the semiconductor laser is modulated, an intensity distribution on the cross section perpendicular to the optical axis of a laser beam also changes. Therefore, the tilt can be detected by replacing a change in the coma by a change in the intensity distribution. In this case, it is obvious that the tilt can be corrected by the same method as the above-described embodiment.

As above, according to the present invention, a tilt can be detected from a signal output when the injection current to the semiconductor laser is modulated, and the tilt can be corrected by setting the injection current to the semiconductor laser in accordance with the detected tilt. Accordingly, a tilt can be detected and corrected without adding new components for the tilt detection. Furthermore, since the tilt is detected and corrected through electrical modulation, the system can be made compact without using a mechanical actuator which requires a large space. Still further, high speed control up to a high frequency is possible because there is no limit of the control bandwidth to be caused by sub-resonances in a high frequency band.

What is claimed is:

1. A method of detecting a tilt between a direction normal to a surface of an optical disk and a converging optical system, the optical disk being used for at least information reproduction by converging a laser beam radiated from a semiconductor layer onto the optical disk by the converging optical system, the method comprising the step of:

modulating a wave front or intensity distribution of the laser beam by injecting a predetermined current to a main electrode of the semiconductor laser and by changing injection currents to a plurality of subsidiary electrodes by predetermined amounts, and detecting a tilt amount between the optical disk and the converging optical system at a cross point between an optical axis of the laser beam and a recording surface of the optical disk, by obtaining a difference of reproduced signal outputs before and after the modulation corresponding to the laser beams reflected from the optical disk.

2. A method of detecting a tilt between a direction normal to a surface of an optical disk and a converging optical system, the optical disk being used for at least information reproduction by converging a laser beam radiated from a semiconductor layer onto the optical disk by the converging optical system, the method comprising the step of:

modulating a wave front or intensity distribution of the laser beam by injecting a predetermined current to a main electrode of the semiconductor laser and by controlling injection currents to a plurality of subsidiary electrodes, synchronously with converging the laser beam onto an area of the optical disk where a signal of a predetermined frequency is recorded, onto a pit of the optical disk dedicated for tilt detection, onto a pit of the optical disk formed in a sector field, or onto an area of the optical disk where no signal is recorded, and detecting a tilt amount between the optical disk and the converging optical system in accordance with reproduced signal outputs before and after the modulation corresponding to the laser beams reflected from the optical disk.

3. An optical disk drive having a semiconductor laser with a main electrode and a plurality of subsidiary electrodes for current injection, a converging optical system for converging a laser beam radiated from the semiconductor laser onto an optical disk, a reproduced signal detection circuit for detecting a reproduced signal from the laser beam reflected by the optical disk, and a laser control circuit for controlling injection currents to the main electrode and the plurality of subsidiary electrodes, the optical disk drive comprising:

a tilt detection circuit for controlling the laser control circuit to change injection currents to the plurality of subsidiary electrodes, storing the outputs of the reproduced signal detection circuit corresponding to outputs before and after the injection current change, and obtaining a tilt between the optical disk and the converging optical system in accordance with the stored outputs, wherein in accordance with an output of the tilt detection circuit, the laser control circuit controls the injection currents to the plurality of subsidiary electrodes of the semiconductor laser.

4. An optical disk drive having a semiconductor laser with a main electrode and a plurality of subsidiary electrodes for current injection, a converging optical system for converging a laser beam radiated from the semiconductor laser onto an optical disk, a reproduced signal detection circuit for detecting a reproduced signal from the laser beam reflected by the semiconductor laser, and a laser control circuit for controlling injection currents to the main electrode and the plurality of subsidiary electrodes, the optical disk drive comprising:

a tilt detection/correction circuit including a tilt detection circuit for detecting a tilt between the optical disk and the converging optical system in accordance with outputs of the reproduced signal detection circuit, and a tilt correction circuit for obtaining a correction amount to cancel the tilt, wherein said tilt detection/correction circuit supplies the laser control circuit with correction amounts of the injection currents to the plurality of subsidiary electrodes, synchronously with converging the laser beam onto an area of the optical disk where a signal of a predetermined frequency is recorded, onto a pit of the optical disk dedicated for tilt detection, onto a pit of the optical disk formed in a sector field, or onto an area of the optical disk where no signal is recorded.

5. An optical disk drive according to claim 4, wherein said tilt detection circuit includes a table for storing a relation between the injection current and a tilt angle by obtaining in advance a relation between the injection current and a reproduced signal, and said tilt correction circuit supplies the laser control circuit with the correction amount of the injection current to make a difference between reproduces signals be zero.

* * * * *